Aug. 3, 1954 — L. L. PATCHETT — 2,685,454
TRAILER STABILIZING HITCH
Filed Jan. 30, 1953 — 2 Sheets-Sheet 2
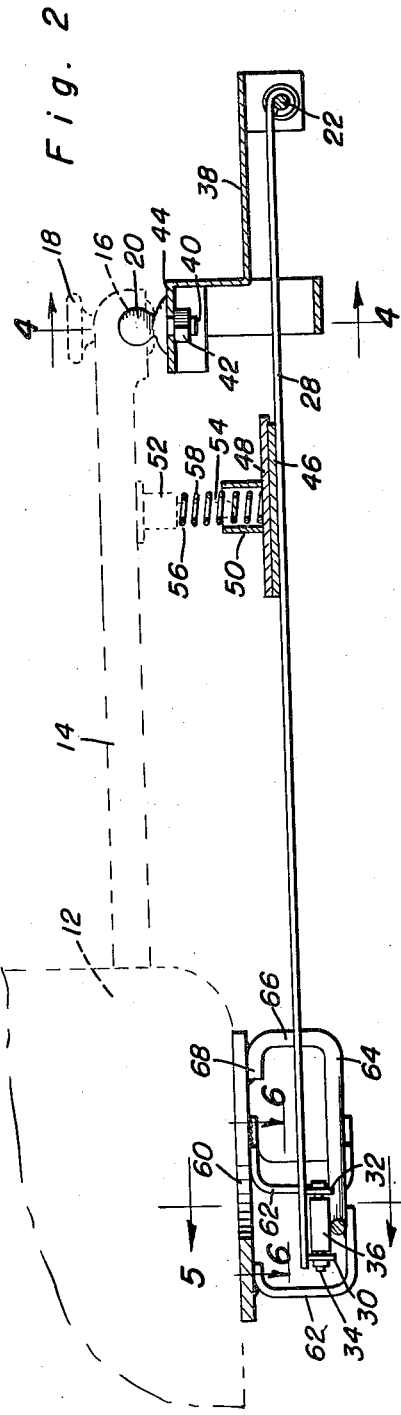
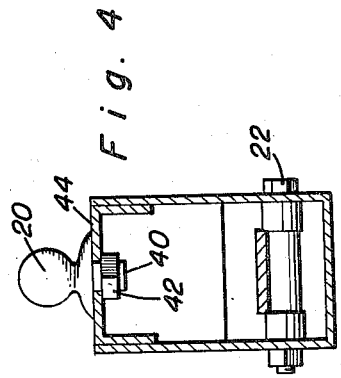
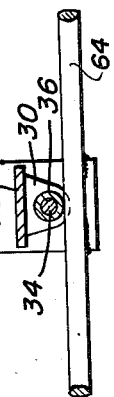
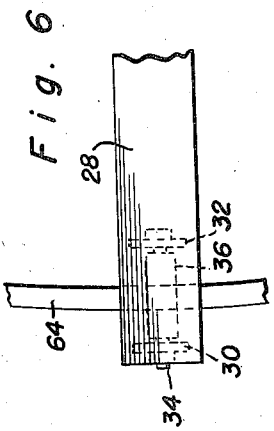
Leslie L. Patchett
INVENTOR.
BY Clarence A. O'Brien
and Harvey B. Jacobson
Attorneys Patented Aug. 3, 1954

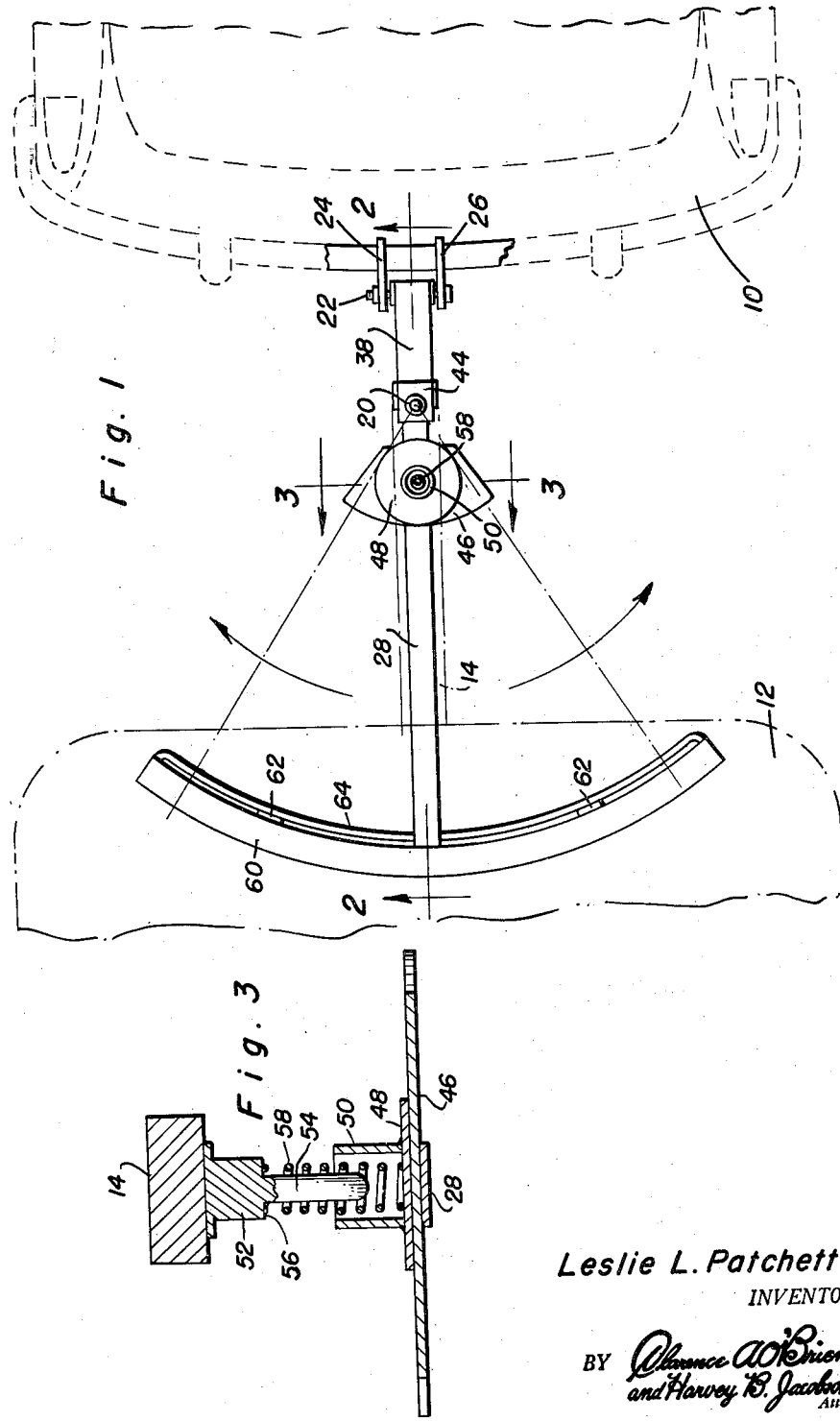

2,685,454

UNITED STATES PATENT OFFICE 2,685,454

TRAILER STABILIZING HITCH

Leslie L. Patchett, Reddick, Ill.

Application January 30, 1953, Serial No. 334,271

5 Claims. (Cl. 280—461)

This invention relates to hitches between a tractor and a trailer vehicle and more particularly to means for stabilizing the trailer.

The primary object of this invention resides in the provision of a trailer stabilizer that employs means for preventing and limiting side sway and rebounding of the trailer relative to the towing vehicle.

A further object of this invention resides in the provision of a trailer stabilizer that may be readily attached to conventional vehicles in a simple and easy manner which employs friction resistance to unwanted movements which would cause side sway and rebounding such as is caused by the normal wavering of a vehicle while being driven over uneven roads or at any time when the driver of the towing vehicle cannot readily pursue an absolutely straight path.

Still further objects and features of the invention reside in the provision of a stabilizer attachment for a trailer that is strong and durable, simple in construction and manufacture, capable of being formed out of readily available materials, and which may be easily attached to conventional vehicles without any major modification thereof, while being capable of being produced at a relatively low cost.

These, together with the various ancillary objects and features of the invention which will become apparent as the following description proceeds, are attained by this trailer stabilizer, a preferred embodiment of which has been illustrated in the accompanying drawings, by way of example only, wherein:

Figure 1 is a top plan view showing the trailer stabilizer in operative implacement on the towing and towed vehicles;

Figure 2 is a vertical sectional view as taken along the plane of line 2—2 in Figure 1;

Figure 3 is a vertical sectional view as taken along the plane of line 3—3 in Figure 1;

Figure 4 is a vertical sectional view as taken along the plane of line 4—4 in Figure 2 and showing the construction of the bracket for use in securing the draw bar of the trailer to the towing vehicle;

Figure 5 is a vertical sectional view as taken along the plane of line 5—5 in Figure 2; and Figure 6 is a horizontal sectional view as taken along the plane of line 6—6 in Figure 2.

With continuing reference to the accompanying drawings wherein like reference numerals designate similar parts throughout the various views, reference numeral 10 generally designates a tractor vehicle and reference numeral 12 the trailer or towed vehicle. The trailer vehicle 12 is provided with a draw bar 14 of conventional design which is provided with a ball receiving socket 16 and a rotatable clamp 18 of conventional construction which is adapted to receive and clamp around the base of the ball as at 20 received within the ball receiving socket 16. A shaft 22 is attached to the tractor vehicle 10 by means of suitable securing members 24 and 26 or by other desirable means. Pivotally secured about the shaft 22 is a stabilizer bar 28 which is provided with a pair of flanges 30 and 32 at the other end thereof. The flanges 30 and 32 have a pin 34 journalled therein which carries a roller 36. Extending about and carried by the stabilizer bar 28 is a bracket 38 which has the ball 20 secured therethrough, the ball being provided with a threaded portion 40 which is secured by means of nut 42 to the upper portion 44 of the bracket 38. Welded or otherwise secured to the stabilizer bar 28 is an arcuate base plate 46. The arcuate base plate 46 carries a disk or friction plate 48 having a cylindrical retainer 50 secured thereto. The draw bar has a pin as at 52 having a portion 54 of reduced cross-sectional area to form a shoulder as at 56 secured thereto. Received within the cylinder 50 and engaged about the pin portion 54 is a coil spring 58, this coil spring 58 biasing the pin 52 and hence the draw bar 14 and the friction plate 48 resists movement of the draw bar 14 relative to the stabilizer bar 28.

There is provided an arcuate plate 60 which is adapted to be secured to the trailer vehicle 12. This arcuate plate 60 has depending therefrom five spaced brackets as at 62 which support an arcuate rail or track 64 which has upwardly curved ends 66 which are welded or otherwise secured at their tips as at 68 to the plate 60. The roller 36 is engaged about the track 64 and continually rests on the track 64 rotating as does the draw bar 14.

In operation with the trailer and tractor secured together the spring 58 will cause the friction disk 48 to damp the relative movement of the draw bar 14 and the stabilizer bar 28. This will substantially eliminate any unnecessary side sway due to any erratic motion of the tractor vehicle. The roller 36 will engage the track rail 64 when the draw bar 14 and hence the stabilizer bar 28 is rotated or pivoted due to a change of direction of the tractor vehicle.

Since from the foregoing, the construction and advantages of this stabilizer bar are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to that fall within the scope of the appended claims.

What is claimed as new is as follows:

1. A trailer stabilizer for use in combination with a tractor vehicle and a trailer comprising an arcuate track secured to and depending from said trailer, a stabilizer bar pivotally attached for vertical movement to said tractor, a bracket carried by said stabilizer bar, said bracket being adapted to receive the draw bar of said trailer, a roller carried by said stabilizer bar engaging said track, and damping means carried by said stabilizer bar for frictionally resisting relative movement of said draw bar and said stabilizer bar, said damping means including a base plate secured to said stabilizer bar, a friction plate resting on said base plate, a cylindrical retainer secured to said friction plate, a pin carried by said draw bar, and a spring engaged within said retainer and about said pin.

2. A trailer stabilizer for use in combination with a tractor vehicle and a trailer comprising an arcuate track secured to and depending from said trailer, a stabilizer bar pivotally attached for vertical movement to said tractor, a bracket carried by said stabilizer bar, said bracket being adapted to receive the draw bar of said trailer, a roller carried by said stabilizer bar engaging said track, and damping means carried by said stabilizer bar for frictionally resisting relative movement of said draw bar and said stabilizer bar, said damping means including a base plate secured to said stabilizer bar, a friction plate resting on said base plate, and means biasing said friction plate and said draw bar.

3. A trailer stabilizer for use in combination with a tractor vehicle and a trailer comprising an arcuate track secured to and depending from said trailer, a stabilizer bar pivotally attached for vertical movement to said tractor, a bracket carried by said stabilizer bar, said bracket being adapted to receive the draw bar of said trailer, a roller carried by said stabilizer bar engaging said track, and damping means carried by said stabilizer bar for frictionally resisting relative movement of said draw bar and said stabilizer bar, said arcuate track including an arcuate plate, a plurality of supporting brackets attached to said arcuate plate, and an arcuate track rail carried by said brackets and terminally secured to said arcuate plate, said damping means including a base plate secured to said stabilizer bar, a friction plate resting on said base plate, a cylindrical retainer secured to said friction plate, a pin carried by said draw bar, and a spring engaged within said retainer and about said pin.

4. A trailer stabilizer for use in combination with a tractor vehicle and a trailer comprising an arcuate track secured to and depending from said trailer, a stabilizer bar pivotally attached for vertical movement to said tractor, a bracket carried by said stabilizer bar, said bracket being adapted to receive the draw bar of said trailer, a roller carried by said stabilizer bar engaging said track, and damping means carried by said stabilizer bar for frictionally resisting relative movement of said draw bar and said stabilizer bar, a plurality of flanges depending from said stabilizer bar, said roller being journalled in said brackets, said damping means including a base plate secured to said stabilizer bar, a friction plate resting on said base plate, a cylindrical retainer secured to said friction plate, a pin carried by said draw bar, and a spring engaged within said retainer and about said pin.

5. A trailer stabilizer for use in combination with a tractor vehicle and a trailer comprising an arcuate track secured to and depending from said trailer, a stabilizer bar pivotally attached for vertical movement to said tractor, a bracket carried by said stabilizer bar, said bracket being adapted to receive the draw bar of said trailer, a roller carried by said stabilizer bar engaging said track, and damping means carried by said stabilizer bar for frictionally resisting relative movement of said draw bar and said stabilizer bar, said arcuate track including an arcuate plate, a plurality of supporting brackets attached to said arcuate plate, and an arcuate track rail carried by said brackets and terminally secured to said arcuate plate, a plurality of flanges depending from said stabilizer bar, said roller being journalled in said brackets and riding upon said track rail, said damping means including a base plate secured to said stabilizer bar, a friction plate resting on said base plate, and means biasing said friction plate and said draw bar.

References Cited in the file of this patent

UNITED STATES PATENTS

| Number | Name | Date |
|---|---|---|
| 2,091,668 | Bradford | Aug. 31, 1947 |
| 2,474,296 | Wiltsee | June 28, 1949 |
| 2,490,645 | Murat | Dec. 6, 1949 |
| 2,517,047 | Spitler | Aug. 1, 1950 |
| 2,524,312 | Garnett | Oct. 3, 1950 |